United States Patent [19]

Earp, Jr.

[11] 3,972,552

[45] Aug. 3, 1976

[54] GUTTER CLEANER

[76] Inventor: James Wiley Earp, Jr., 6816 Justice Drive, Raleigh, N.C. 27609

[22] Filed: Mar. 3, 1975

[21] Appl. No.: 555,066

[52] U.S. Cl............................................. 294/19 R
[51] Int. Cl.².................... B25J 1/02; E04D 13/06
[58] Field of Search............. 294/1 R, 19 R, 20, 22, 294/23, 50.8, 50.9, 100; 15/104.3 G, 236 R; 56/332, 333, 334, 400.12, 400.16, 400.21

[56] References Cited
UNITED STATES PATENTS

| 227,444 | 5/1880 | Perry | 294/22 |
|---|---|---|---|
| 857,182 | 6/1907 | Lancaster | 294/50.9 X |
| 1,160,282 | 11/1915 | Harris et al. | 294/50.9 X |
| 1,322,537 | 11/1919 | Cartwright | 294/50.9 |
| 2,720,409 | 10/1955 | Griffith | 294/19 R |
| 3,626,542 | 12/1971 | Despain et al. | 294/19 R X |

FOREIGN PATENTS OR APPLICATIONS

| 480,369 | 4/1953 | Italy | 294/22 |
|---|---|---|---|

*Primary Examiner*—John J. Love
*Assistant Examiner*—Johnny D. Cherry
*Attorney, Agent, or Firm*—Mills & Coats

[57] ABSTRACT

The present invention relates to a gutter cleaner for cleaning and removing leaves and other debris from a gutter. The gutter cleaner is characterized by an elongated handle that enables the same to be hand-held by an individual at ground level and adapted to extend upwardly above the level of the gutter to be cleaned. Pivotably mounted to the upper portion of the elongated handle is a pair of arms pivotably mounted about a common axis and spring biased to outward open positions. Secured to the lower remote ends of each of said arms is a pair of tine assemblies or cleaning hands that are adapted to move along the gutter towards each other so as to accumulate leaves and other debris therebetween. To actuate the arms and consequently the tine assemblies, there is provided a flexible connecting means such as a rope or cord that is fixed to each of the arms at a point intermediate the ends and extending downwardly therefrom to where the individual holding the elongated handle may actuate the arms from ground level by pulling the rope and consequently urging the arms inwardly such that the tine assemblies are moved inwardly towards each other so as to accumulate the leaves and other debris into a bundle of material that can be readily removed.

6 Claims, 5 Drawing Figures

GUTTER CLEANER

The present invention relates to gutter cleaners, and more particularly to the type of gutter cleaners that are hand-held and operated by an individual from ground level or from some point substantially below the level of the gutter to be cleaned.

BACKGROUND OF THE INVENTION

Although necessary, cleaning gutters has long been considered a dirty and undesirable chore. Moreover, and perhaps most important, gutter cleaning is awkward and often unsafe as the homeowner or individual cleaning the gutter performs the gutter cleaning while standing on the edge of the roof. This is particularly dangerous and hazardous where the individual doing the gutter cleaning is an elderly person.

In addition, conventional gutter cleaners have been primarily concerned with cleaning the gutter and the designs thereof have not been concerned with efficient material handling after the material has been removed from the gutter. Typically, one finds that after removing the leaves and other debris from the gutter, that little control is maintained over the material removed. Often the removed material is dropped along the adjacent edge of the roof or even dropped along the ground underneath the gutter being cleaned. Certainly, the object is to clean the gutter, but also it is most desirable to maintain control over the removed material so that it can be properly discarded in a trash container, trailer, or the like.

SUMMARY OF THE INVENTION

The present invention has been devised to provide a gutter cleaner that can be operated and actuated from a position substantially below the level of the gutter. In particularly, the gutter cleaner of the present invention includes an elongated handle that is generally held by an individual at ground level, the handle extending upwardly from the individual above the level of the gutter to be cleaned. Pivotably mounted to a common axis about the top portion of the elongated handle is a pair of downwadly extending arms spring biased to open positions, each arm including a tine cleaning assembly about the lower remote end that is adapated to fit within a conventional gutter and to move therealong so as to engage in an accumulating sweeping fashion the material such as leaves, straw and other debris that may be embedded and contained within the gutter.

Operatively connected to each of the arms is a flexible cord-like connecting member that extends downwardly to where the operating individual may hold and by pulling the same while the tine assemblies are properly disposed in the gutter to be cleaned, it is seen that the arms are pulled inwardly causing the tine cleaning assemblies to move inwardly such that in the process of inward movement the leaves, debris and other material lying in the gutter therebetween is accumulated and rolled up so as to be securedly held between the tine assemblies as they are pulled closer inwardly. After the material is securedly held between and within the tine assemblies, the individual at ground level can slightly lift the tine assemblies above the gutter and guide the accumulated material to a desired position or locality while still maintaining tension on the flexible cord. Once the tine asemblies and the material accumulated therebetween are at an appropriate discarding area, the individual can release the tension on the cord or rope and because the arms are biased outwardly, the tine assemblies automatically open, releasing the removed material.

Therefore, it is seen that the gutter cleaner of the present invention is an efficient and safe device for cleaning gutters as an individual can perform this operation by standing at ground level or at least a substantial distance below the level of the gutter to be cleaned. In addition, this type of gutter cleaner enables the individual to maintain control over the removed material and to deposit the removed material at a proper location or site.

It is, therefore, an object of the present invention to provide a gutter cleaning device that may be operated and actuated by an individual standing at ground level or at a distance substantially below the level of the gutter to be cleaned.

A further object of the present invention resides in the provision of a gutter cleaner that is adapted to remove debris and other forms of material from a gutter and to maintain control of that material in order that an individual operating the device can properly disposed of the material without dropping the material about the edge of the roof and along the ground underneath the gutter.

Still a further object of the present invention is to provide an efficient gutter cleaning apparatus wherein the same comprises a pair of cooperating arms, each having a tine assembly or cleaning hand fixed to the lower remote ends thereof such that upon actuation the arms are moved inwardly toward each other causing the tine assemblies or cleaning hands to move along and within the gutter sweeping the material inwardly therebetween causing the material to accumulate and roll up and to be held securedly therebetween as the arms and tine assemblies are drawn closer together.

A further object of the present invention is to provide a gutter cleaning apparatus including a pair of cooperating tine assemblies that act to move along and within the gutter in a cooperative fashion so as to accumulate and roll up material within the gutter therebetween, said tine assemblies or cleaning hands having a plurality of tines fixed thereto and projecting generally inwardly therefrom so as to possess an aggressive action that in effect will even loosen material that is stuck or caked to the inner wall structure of the gutter.

Another object of the present invention is to provide a gutter cleaning apparatus that includes an elongated handle supporting a pair of cooperating arms spring biased outwardly to open positions, each arm having a tine assembly fixed to the lower ends thereof for cooperating with each other in the gutter cleaning process, and wherein said arms and tine assemblies may be selectively actuated by an individual standing at ground level by an elongated flexible cord operatively connected to both arms and extending downwardly therefrom into the grasp of the individual holding and supporting the gutter cleaning apparatus.

Other objects and advantages of the present invention will become apparent from a study of the following description and the accompanying drawings which are merely illustrative of the present invention.

DESCRIPTION OF THE PREFERRED EMBODIMENT

Figure 2:
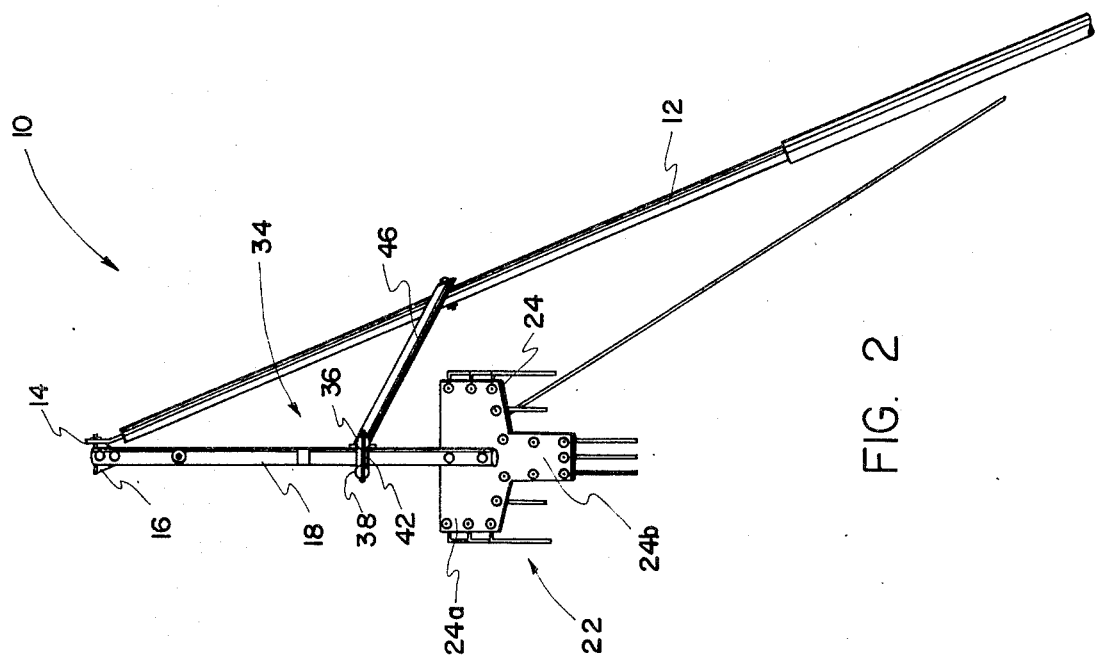
FIG. 2 is a side elevational view of the gutter cleaner.
Figure 1:
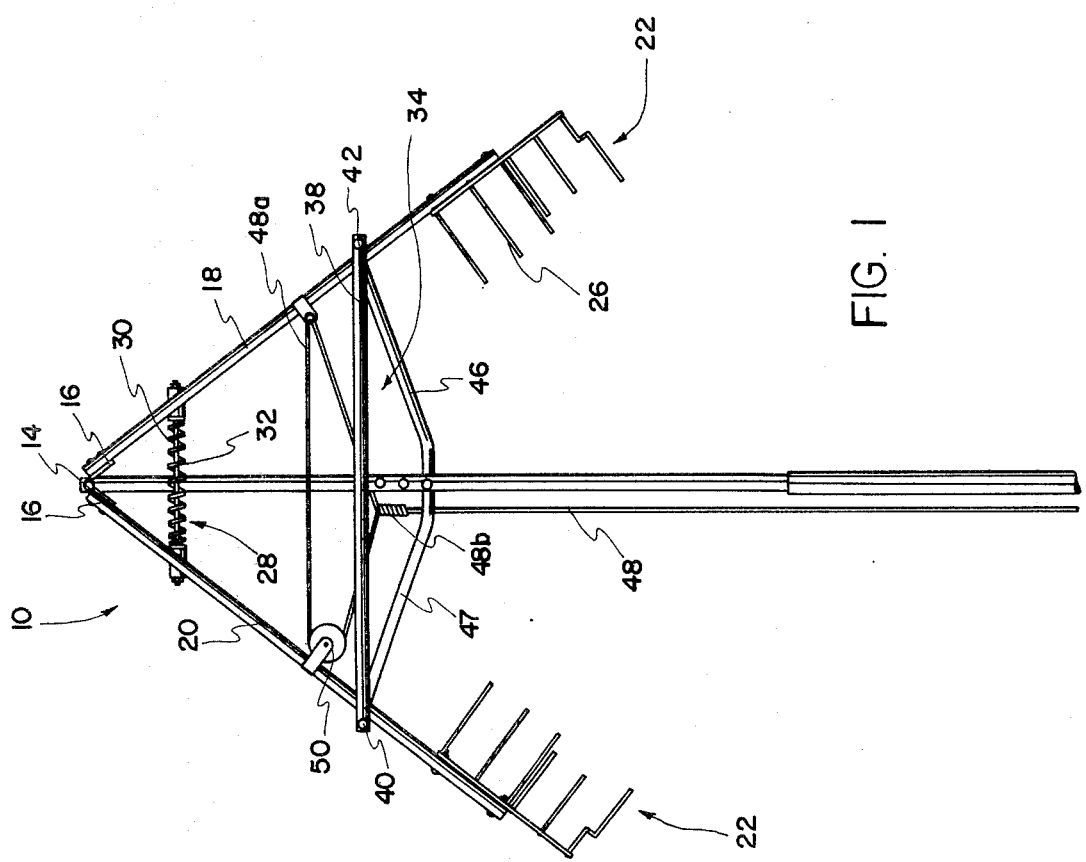
FIG. 1 is a front side elevational view of the gutter cleaner of the present invention.
Figure 4:
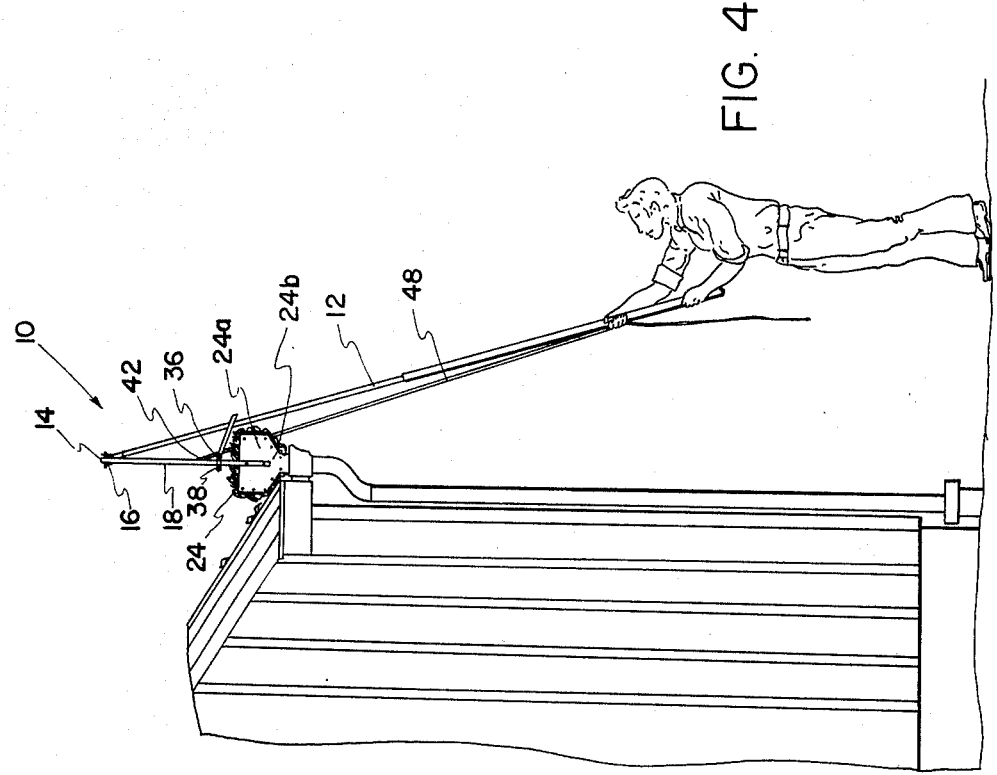
FIG. 4 is a side elevational view of the gutter cleaner, illustrating the gutter cleaner cleaning an elevated gutter.
Figure 3:
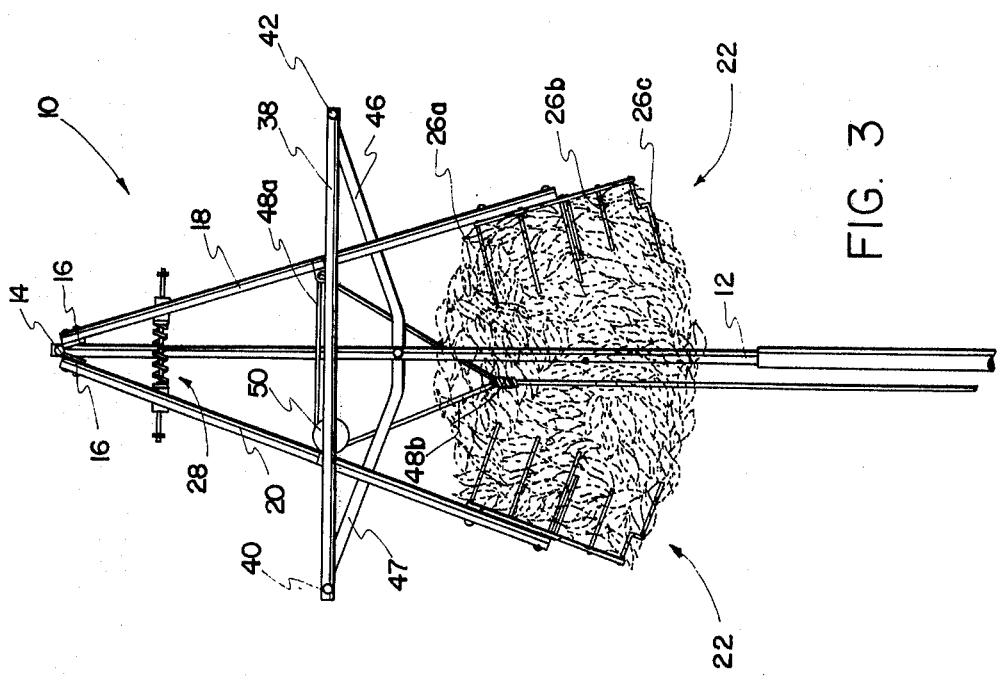
FIG. 3 is a front elevational view of the gutter cleaner with the cleaning hands being drawn inwardly toward each other.

With further reference to the drawings, particularly FIGS. 1–4, the gutter cleaning apparatus of the present invention is shown therein and indicated generally by the numeral 10. Viewing the gutter cleaner in detail, it is seen that the same comprises an elongated tubular handle extension 12 (which may be of a telescoping construction) that is adapted to be held and supported by an individual at ground level or at a position substantially below the level of the gutter to be cleaned. Elongated handle extension 12 extends upwardly from the individual to a height above the level of the gutter to be cleaned. At the upper end of the elongated handle extension 12 there is fixed a pivot pin 14 that extends outwardly from the handle 12 and has secured thereto a pivoting double wing hinge 16.

Fixed to each of the wings of the hinge 16 is arms 18 or 20 that extends generally downwardly therefrom in a plane spaced outwardly from the axis of the elongated handle 12.

Figure 5:
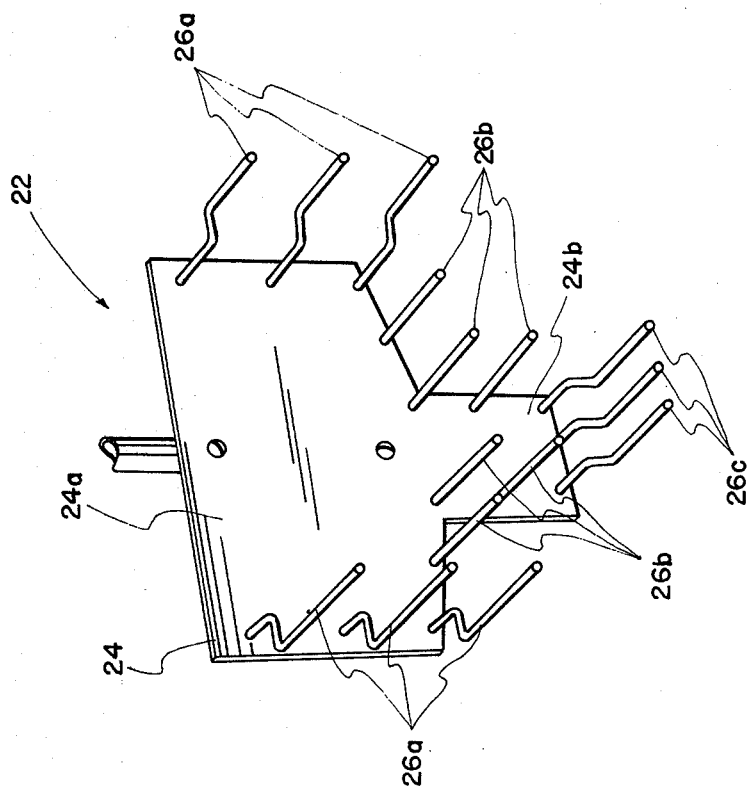
FIG. 5 is a fragmentary perspective view of a respective cleaning hand which forms a part of the gutter cleaner of the present invention.

A tine assembly or cleaning hand, indicated generally by the numeral 22, is fixed to the lower remote end of each arm 18 or 20. The tine assembly or cleaning hand 22 on each arm includes a generally T-shaped back 24 that, as viewed in FIG. 5, comprises an upper main body portion 24a and a lower extending base or tab portion 24b. Around the outer sides and lower border portions of the back 24, there is provided a plurality of spaced apart inwardly projecting tines 26. The tines disposed about the outer border of the upper portion 24a are relatively long and straight, while the tines disposed around the lower bottom edge of the main upper portion 24a and the side edge of the lower extending tab 24b are referred to as intermediate length tines 26b as they are somewhat shorter than tines 26a. Also, the tines about the lower border of the lower extending base or tab 24b are generally curved shaped and are referred to by the numeral 26c. More particularly, the curved shaped tines 26c extend inwardly from the inner side of the lower extending tab 24b of the back 24 a predetermined distance at which point the tines are curved a short distance generally downwardly to a point where the tines are again curved such that they extend generally inwardly parallel to the other tines 26.

By the particular use of this tine design and the shape of the back 24, it is appreciated that the tine assemblies or cleaning hands 22 are adapted to engage and remove leaves and other debris from the gutter being cleaned. Particularly, the lower extending base or tab portion 24a of the tine assembly or cleaning hands 22 is adapted to penetrate downwardly into the gutter itself and to engage the material therein as the arms are actuated inwardly.

Arms 18 and 20 and the tine assemblies 22 associated therewith are normally disposed in spaced apart outward positions and this is accomplished by the provision of biasing means indicated generally by the numeral 28 which engage both arms and urge the same outwardly to the normally open spaced apart positions. Viewing the biasing means in more detail, it is seen that the same includes a cross member 30 that extends through general aligned openings formed in the arms 18 and 20 and which may include stops formed on opposite ends thereof. Wound around the cross member 30 between the arms 18 and 20 is a coil spring 32 that engages the inner sides of the arms 18 and 20 and consequently, biases and urges the same to their outwardly open position as viewed in FIG. 1.

To maintain the arms 18 and 20 and the tine assemblies 22 associated therewith in a common operating plane, there is provided a guide frame assembly 34 that is secured to the elongated handle 12 and is disposed outwardly therefrom to where the same encompass the two arms 18 and 20. More particularly, the guide frame assembly 34 includes two guide members 36 and 38 that extend in parallel relationship with respect to each other, each member being disposed on a respective side of the arms 18 and 20 so as to define an opening therebetween in which the arms 18 and 20 may freely move back and forth therein during the gutter cleaning operation. Connected between opposite ends of the guide members 36 and 38 are a pair of end connecting members 40 and 42 which serve to hold the guide members together and to provide proper spacing therebetween for the arms 18 and 20 to move therethrough. Finally, the guide frame assembly 34 includes two brace members 46 and 47, preferably of a tubular construction, which are fixed to the elongated handle 12 at a point generally spaced downwardly from the pivot pin 14 and extending radially therefrom where the brace members connect to respective ends of the innermost disposed guide member 36.

To actuate the arms 18 and 20 consequently to cause the tine assemblies to be moved inwardly towards each other, there is provided a flexible connecting means 48 in the form of a cord, rope or the like which includes an upper closed loop 48a that is fixed to arm 18 by a connecting bracket or the like and is trained around pulley 50 that is supported by arm 20. The closed upper loop 48a joins the main portion of the connecting means 48 at a lower apex point 48b where the main portion of the flexible connecting means extends downwardly generally along side the elongated tubular handle 12. It should be appreciated that as far as the connection between arms 18 and 20, that various other arrangements of pulleys and cross ties may be used to gain mechanical advantage for the operator actuating the flexible connecting means 48.

In operation, it is appreciated that the gutter cleaner 10 of the present invention can be supported and actuated from ground level by an individual. The individual in cleaning a gutter positions the handle 12 such that the tine assemblies 22 overlie and are in alignment with the gutter segment to be cleaned. The tine assemblies 22 are lowered into the gutter and particularly the lower extending base or tab portions 24b actually penetrate into the gutter itself.

By pulling the flexible connecton 48, the arms 18 and 20 are pulled inwardly against the biasing of the coil spring 32, causing the tine assemblies to move inwardly towards each other. As the tine assemblies or cleaning hands 22 move inwardly towards each other, the leaves, debris and other forms of material lying in the gutter between the positions normally assumed by the tine assemblies or cleaning hands 22 are engaged and caused to accumulate and roll up between the two respective cooperating tine assemblies 22. After a bundle or batch of material is securely held between the tine assemblies or cleaning hands 22, the operator then continues to maintain tension on the flexible connection 48 and removes the gutter cleaner from the vicinity of the gutter being cleaned to a locality where the material can be properly discarded. By relieving the tension on the flexible connection 48, the arms 18 and 20 are spring biased to their outer position causing the material formerly held between the tine assemblies 22 to be properly dumped. This cleaning process is continued along the length of the gutter until the leaves, debris and other material therein has been cleaned from the eintire length of the gutter.

From the foregoing specification, it is seen that the gutter cleaner 10 of the present invention is easy to operate and can be operated and actuated by an individual without having to position himself on the roof to clean the gutter Specifically, the gutter cleaner 10 of the present invention is adapted to be hand-held and supported at a ground level position or at a position substantially below the level of the gutter to be cleaned, thereby avoiding the unsafe and often hazardous job of actually being required to clean the gutter from the roof. In addition, the gutter cleaner of the present invention has the advantage of being quite aggressive during the cleaning operation as the tines tend to penetrate and separate material that may be clogged or stuck to the gutter.

The terms "upper", "lower", "forward", "rearward", etc., have been used herein merely for the convenience of the foregoing specification and in the appended claims to describe the gutter cleaner and its parts as oriented in the drawings. It is to be understood, however, that these terms are in no way limiting to the invention since the gutter cleaner may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range are intended to be embraced herein.

What is claimed is:

1. A hand-held gutter cleaner for removing leaves and other debris from a gutter, said gutter cleaner comprising: an elongated handle; a pair of cooperating arms pivotably mounted about a common axis about one end of said elongated handle; a tine assembly secured to a remote end of each cooperating arm, and including a plurality of tines projecting generally inwardly therefrom; a guide frame assembly having a pair of spaced apart parallel extending guide members disposed on each side of said pair of cooperating arms and defining an opening therebetween for enabling said arms to move therethrough; means for biasing said pair of cooperating arms outwardly relative to each other such that said arms and the tine assemblies associated therewith normally assume an open outwardly spaced apart position; and actuating means operatively connected to said pair of cooperating arms and extending therefrom for moving said arms inwardly towards each other and closing said tine assemblies toward each other, said actuating means including a flexible connecting means operatively connected to each of said cooperating arms at a point intermediate the ends thereof and extends therefrom whereby said cooperating arms can be actuated by an individual at a location remote from said cooperating arms such that when placed within a gutter said tine assemblies upon actuating move inwardly toward each other and in so doing, leaves and other debris are accumulated and held therebetween, thereby allowing the leaves and other debris to be cleaned and removed from the gutter.

2. The gutter cleaner of claim 1 wherein each tine assembly includes a generally planar back fixed to the inward side of a respective cooperating arm about the remote end thereof, and wherein said tines are secured about periphery portions of said back and project inwardly therefrom.

3. The gutter cleaner of claim 2 wherein said generally planar back is generally T-shaped and wherein the tines project from the outer side and bottom border areas of said generally T-shaped back, and wherein the tines about a lower base portion of the T-shaped back extend inwardly from the plane of said back a predetermined distance at which point the tines are curved generally downwardly a relatively short distance at which point the tines are curved back inwardly generally parallel with the other tines of respective tine assembly.

4. The gutter cleaner of claim 1 wherein said guide frame assembly further includes a pair of brace members, each brace member being secured at one end to said handle and extending therefrom where the other end is secured to a respective end portion of one of said parallel extending guide members.

5. The gutter cleaner of claim 1 wherein said means for biasing said cooperating arms outwardly includes a cross member extending between the respective cooperating arms and having a coil spring disposed therearound such that said coil spring engages the inner side of each of said respective cooperating arms, thereby tending to urge and bias the same outwardly.

6. A hand-held and hand-actuated gutter cleaner adapted to be utilized by an individual at ground level to clean and remove leaves and other debris from a gutter, said gutter cleaner comprising:
 a. an elongated handle adapted to be held by the individual at ground level and to project upwardly therefrom above the level of a gutter to be cleaned;
 b. a pair of cooperating arms pivotably mounted about a common axis to an upper portion of said elongated handle and extending downwardly therefrom;
 c. a tine assembly fixed to the lower end of each cooperating arm and including a back portion and a plurality of tines fixed to said back portion and extending generally inwardly therefrom;
 d. biasing means interposed between said cooperating arms for normally biasing both arms outwardly to where said tine assemblies assume an open spaced apart positions, said biasing means including a cross member extending through openings formed within said spaced apart cooperating arms and having a coil spring wound around said cross member and engaging the inner sides of said cooperating arms so as to bias and urge the same outwardly;
 e. a guide frame assembly for guiding said pair of cooperating arms when actuated, said guide frame assembly including a pair of spaced apart parallel extending guide members disposed on each side of said cooperating arms so as to define an opening therebetween in which said arms may freely move back and forth, said guide frame assembly further including a pair of brace members fixed at one end to said elongated handle and extending therefrom where the other end is secured to one of the respective parallel guide members; and f. a flexible connecting means operatively connected to both of said cooperating arms and extending downwardly therefrom where the same is held by said individual at ground level, said flexible connecting means operative when pulled to actuate said gutter cleaner by pulling said arms inwardly against the outwardly biasing force of said spring so as to cause said tine assemblies to move inwardly towards each other and to accumulate and gather leaves and other debris from the gutter during the process.

* * * * *